(12) United States Patent
Uchiyama et al.

(10) Patent No.: US 11,762,268 B2
(45) Date of Patent: Sep. 19, 2023

(54) LIGHT SOURCE APPARATUS AND PROJECTOR

(71) Applicant: SEIKO EPSON CORPORATION, Tokyo (JP)

(72) Inventors: Shoichi Uchiyama, Suwa-gun (JP); Chigusa Takagi, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/699,568

(22) Filed: Mar. 21, 2022

(65) Prior Publication Data
US 2022/0299856 A1 Sep. 22, 2022

(30) Foreign Application Priority Data

Mar. 22, 2021 (JP) ................... 2021-047333

(51) Int. Cl.
 G03B 21/20 (2006.01)
 G03B 33/12 (2006.01)
 G02B 5/30 (2006.01)
 H04N 9/31 (2006.01)

(52) U.S. Cl.
 CPC ......... *G03B 21/204* (2013.01); *G02B 5/3083* (2013.01); *G03B 21/2066* (2013.01); *G03B 21/2073* (2013.01); *G03B 33/12* (2013.01); *H04N 9/3161* (2013.01)

(58) Field of Classification Search
 CPC .. G03B 21/204; G03B 21/2073; G03B 33/12; G02B 5/3083

USPC ......................................................... 353/31
See application file for complete search history.

(56) References Cited

U.S. PATENT DOCUMENTS

| 10,355,443 B2 * | 7/2019 | Egawa ................. G02B 3/0062 |
| 2014/0022512 A1 * | 1/2014 | Li ...................... G02B 6/29337 353/31 |
| 2014/0240676 A1 * | 8/2014 | Maes ................... H04N 9/3158 362/583 |
| 2016/0088273 A1 | 3/2016 | Fukui et al. |

FOREIGN PATENT DOCUMENTS

| JP | 2013-250494 A | 12/2013 |
| JP | 6085025 B2 | 2/2017 |

* cited by examiner

*Primary Examiner* — Jerry L Brooks
(74) *Attorney, Agent, or Firm* — Oliff PLC

(57) ABSTRACT

A light source apparatus according to an aspect of the present disclosure includes a light source that outputs excitation light, a wavelength converter including a reflection layer and a wavelength conversion layer that is provided on the light incident side of the reflection layer and converts the excitation light in terms of wavelength into wavelength converted light having a wavelength band different from that of the excitation light, a first optical element that causes the excitation light from the light source to be incident on the wavelength converter, and a second optical element that is disposed in the optical path between the light source and the wavelength converter and causes at least part of reflected light of the excitation light reflected off the wavelength converter to exit toward the wavelength converter.

11 Claims, 11 Drawing Sheets

LIGHT SOURCE APPARATUS AND PROJECTOR

The present application is based on, and claims priority from JP Application Serial Number 2021-047333, filed Mar. 22, 2021, the disclosure of which is hereby incorporated by reference herein in its entirety.

BACKGROUND

1. Technical Field

The present disclosure relates to a light source apparatus and a projector.

2. Related Art

In recent years, as a light source apparatus used in a projector, there is a light source apparatus using fluorescence generated by a phosphor as illumination light (see JP-A-2013-250494, for example). In the light source apparatus, excitation light outputted from a light source is separated by a dichroic mirror as follows: part of the excitation light is incident on a wavelength converter; and the other part of the excitation light is incident on a diffuser, and fluorescence generated by the wavelength converter and blue diffused light generated by the diffuser are combined with each other into white illumination light.

In the light source apparatus described above, the excitation light incident on the wavelength converter is not entirely converted in terms of wavelength, and the excitation light that has not been converted in terms of wavelength returns toward the light source and undesirably forms stray light. It is therefore conceivable, for example, to increase the amount of light outputted by the light source to compensate for the loss resulting from the stray light. In this case, however, the amount of heat generated by the light source increases, and it is therefore necessary to improve the performance of cooling the light source, so that the size of the light source apparatus can undesirably increase.

SUMMARY

To solve the problem described above, according to a first aspect of the present disclosure, there is provided a light source apparatus including a light source that outputs excitation light, a wavelength converter including a reflection layer and a wavelength conversion layer that is provided on a light incident side of the reflection layer and converts the excitation light in terms of wavelength into wavelength converted light having a wavelength band different from a wavelength band of the excitation light, a first optical element that causes the excitation light from the light source to be incident on the wavelength converter, and a second optical element that is disposed in an optical path between the light source and the wavelength converter and causes at least part of reflected light of the excitation light reflected off the wavelength converter to exit toward the wavelength converter.

According to a second aspect of the present disclosure, there is provided a projector including the light source apparatus according to the first aspect of the present disclosure, a light modulator that modulates light from the light source apparatus in accordance with image information, and a projection optical apparatus that projects the light modulated by the light modulator.

DESCRIPTION OF EXEMPLARY EMBODIMENTS

Figure 1:
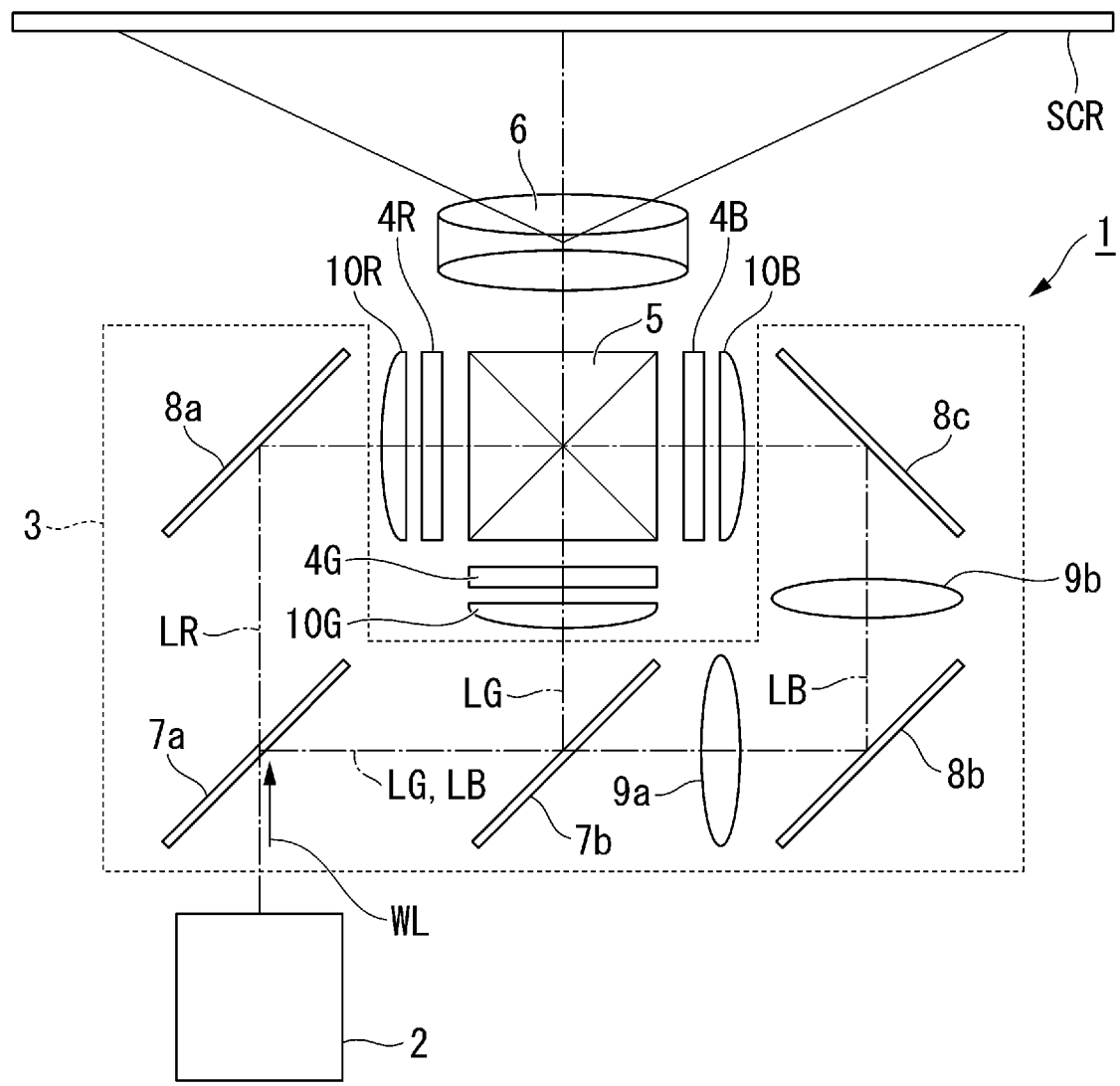
FIG. 1 shows a schematic configuration of a projector according to a first embodiment.

Embodiments of the present disclosure will be described below in detail with reference to the drawings.

In the drawings used in the description below, a characteristic portion is enlarged for convenience in some cases for clarity of the characteristic thereof, and the dimension ratio and other factors of each component are therefore not always equal to actual values.

First Embodiment

An example of a projector according to the present embodiment will be described.

FIG. 1 shows a schematic configuration of the projector according to the present embodiment.

A projector 1 according to the present embodiment is a projection-type image display apparatus that displays color video images on a screen SCR, as shown in FIG. 1. The projector 1 includes a light source apparatus 2, a color separation system 3, light modulators 4R, 4G, and 4B, a light combining system 5, and a projection optical apparatus 6.

The color separation system 3 separates white illumination light WL from the light source apparatus 2 into red light LR, green light LG, and blue light LB. The color separation system 3 includes a first dichroic mirror 7a, a second dichroic mirror 7b, a first total reflection mirror 8a, a second total reflection mirror 8b, a third total reflection mirror 8c, a first relay lens 9a, and a second relay lens 9b.

The first dichroic mirror 7a separates the illumination light WL from the light source apparatus 2 into the red light LR and the other light (green light LG and blue light LB). The first dichroic mirror 7a transmits the separated red light LR and reflects the other light. The second dichroic mirror 7b reflects the green light LG and transmits the blue light LB.

The first total reflection mirror 8a reflects the red light LR toward the light modulator 4R. The second total reflection mirror 8b and the third total reflection mirror 8c guide the blue light LB to the light modulator 4B. The green light LG is reflected off the second dichroic mirror 7b toward the light modulator 4G.

The first relay lens 9a and the second relay lens 9b are disposed downstream of the second dichroic mirror 7b in the optical path of the blue light LB.

The light modulator 4R modulates the red light LR in accordance with image information to form red image light. The light modulator 4G modulates the green light LG in accordance with image information to form green image light. The light modulator 4B modulates the blue light LB in accordance with image information to form blue image light.

The light modulators 4R, 4G, and 4B are each, for example, a transmissive liquid crystal panel. Polarizers (not shown) are disposed on the light incident and exiting sides of each of the liquid crystal panels.

Field lenses 10R, 10G, and 10B are disposed on the light incident side of the light modulators 4R, 4G, and 4B, respectively.

The red image light from the light modulator 4R, the green image light from the light modulator 4G, and the blue image light from the light modulator 4B enter the light combing system 5. The light combining system 5 combines the red image light, the green image light, and the blue image light with one another and outputs the combined image light to the projection optical apparatus 6. The light combining system 5 is formed, for example, of a cross dichroic prism.

The projection optical apparatus 6 is formed of a projection lens group, enlarges the combined image light from the light combining system 5, and projects the enlarged image light toward the screen SCR. Enlarged color video images are thus displayed on the screen SCR.

Light Source Apparatus

Figure 2:
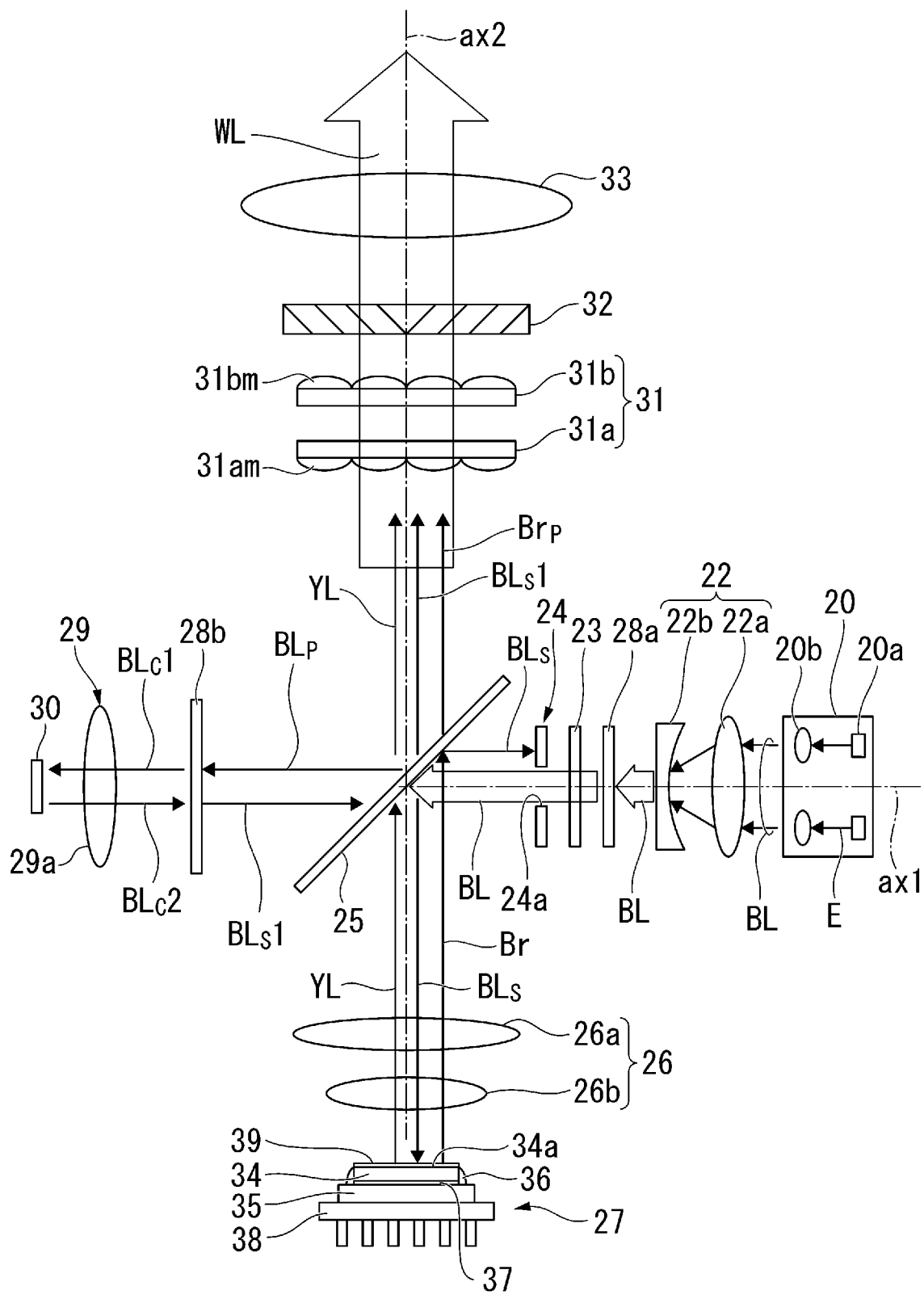
FIG. 2 shows a schematic configuration of a light source apparatus.

The configuration of the light source apparatus 2 described above will next be described. FIG. 2 shows a schematic configuration of the light source apparatus 2.

The light source apparatus 2 includes a light source 20, an afocal optical system 22, a diffusion plate 23, a first phase retarder (phase retarder) 28a, a first optical element 25, a second optical element 24, a first focusing optical system 26, a wavelength converter 27, a second phase retarder 28b, a second focusing optical system 29, a diffuser 30, a lens integrator 31, a polarization converter 32, and a superimposing lens 33, as shown in FIG. 2.

The light source 20, the afocal optical system 22, the first phase retarder 28a, the diffusion plate 23, the second optical element 24, the first optical element 25, the second phase retarder 28b, the second focusing optical system. 29, and the diffuser 30 are sequentially arranged along an optical axis ax1. The optical axis ax1 is the optical axis of the light source 20.

On the other hand, the wavelength converter 27, the first focusing optical system 26, the first optical element 25, the lens integrator 31, the polarization converter 32, and the superimposing lens 33 are sequentially arranged along an illumination optical axis ax2. The optical axis ax1 and the illumination optical axis ax2 are present in the same plane and perpendicular to each other.

The light source 20 includes a plurality of light emitters 20a and a plurality of collimation lenses 20b. The light emitters 20a are each formed of a semiconductor laser. The light emitters 20a each output a light ray E formed of a light beam having a peak wavelength of, for example, 445 nm. A semiconductor laser that outputs the light ray E having a wavelength other than 445 nm can instead be used as each of the light emitters 20a. For example, the light emitters 20a may each output the light ray E formed of a light beam having a peak wavelength of 460 nm.

The plurality of collimation lenses 20b are disposed in correspondence with the light emitters 20a. The collimation lenses 20b each convert the light ray E outputted from the corresponding light emitter 20a into parallelized light. The number of light emitters 20a and collimation lenses 20b is not limited to a specific number. The light source 20 thus outputs excitation light BL in the form of a parallelized luminous flux having a blue wavelength band.

The excitation light BL outputted from the light source 20 enters the afocal optical system 22. The afocal optical system 22 is disposed in the optical path of the excitation light BL between the light source 20 and the first optical element 25. The afocal optical system 22 is a reduction optical system that reduces the luminous flux diameter of the excitation light BL. The afocal optical system (reduction optical system) 22 is formed, for example, of a convex lens 22a and a concave lens 22b.

The excitation light BL having passed through the afocal optical system 22 enters the first phase retarder 28a. The first phase retarder 28a is disposed in the optical path of the excitation light BL between the light source 20 and the first optical element 25. The first phase retarder 28a is, for example, a half wave plate configured to be rotatable. The excitation light BL outputted from the light source 20 is linearly polarized light. Appropriately setting the angle of rotation of the first phase retarder 28a allows the excitation light BL passing through the first phase retarder 28a to be formed of light rays each containing an S-polarization component (first polarization component) and a P-polarization component (second polarization component) with respect to the first optical element 25 mixed with each other at a predetermined ratio. The ratio between the S-polarization component and the P-polarization component can be changed by rotating the first phase retarder 28a. That is, the first phase retarder 28a separates the excitation light BL from the light source 20 into the S-polarization component and the P-polarization component.

The excitation light BL containing the S-polarization and P-polarization components generated when passing through the first phase retarder 28a enters the diffusion plate 23. The diffuser plate 23 can, for example, be a ground glass plate made of optical glass. The diffusion plate 23 diffuses the excitation light BL to increase the uniformity of the illuminance distribution of the excitation light BL to be incident on the wavelength converter 27. The excitation light BL having traveled via the diffusion plate 23 travels toward the second optical element 24.

The second optical element 24 is disposed in the optical path of the excitation light BL between the light source 20 and the wavelength converter 27. The second optical element 24 causes at least part of the excitation light BL reflected off the wavelength converter 27 to exit toward the wavelength converter 27, as will be described later. The second optical element 24 in the present embodiment is formed of a reflection mirror. The second optical element 24 has an opening 24a. The opening 24a has, for example, a circular planar shape.

The second optical element 24 is disposed around the primary luminous flux of the excitation light BL outputted from the light source 20. The primary luminous flux of the excitation light BL means the luminous flux outputted from the light source 20 and traveling toward the wavelength converter 27. That is, it is desirable that the primary luminous flux of the excitation light BL is efficiently incident on the wavelength converter 27.

The second optical element 24 disposed around the primary luminous flux of the excitation light BL does not block the primary luminous flux of the excitation light BL. In the present embodiment, the excitation light BL is incident on the first optical element 25 via the aperture 24a provided in the second optical element 24. The excitation light BL is thus incident on the first optical element 25 without being blocked by the second optical element 24.

In the present embodiment, the second optical element 24 is disposed downstream of the afocal optical system 22. The second optical element 24 is disposed around the excitation light BL having the luminous flux diameter reduced by the afocal optical system 22. The size of the aperture 24a, through which the excitation light BL passes, can thus be reduced.

The excitation light BL having traveled via the aperture 24a of the second optical element 24 is incident on the first optical element 25. The first optical element 25 is so disposed as to incline by 45° with respect to the optical axis ax1 and the illumination optical axis ax2.

The first optical element 25 has a polarization separation function of separating the excitation light BL into light rays BLs, which are each formed of the S-polarization component with respect to the first optical element 25, and light rays BLp, which are each formed of the P-polarization component with respect to the first optical element 25. The first optical element 25 is formed, for example, of a plate-shaped polarization separator.

The first optical element 25 further has a color separation function of transmitting fluorescence YL, which has a wavelength band different from that of the excitation light BL, irrespective of the polarization state of the fluorescence YL. The first optical element 25 thus functions as a combiner that combines part of the excitation light BL and the fluorescence YL with each other, as will be described later.

The first optical element 25 reflects the light rays BLs, which are each formed of the S-polarization component (first polarization component) of the excitation light BL separated by the first phase retarder 28a, to cause the light rays BLs to exit to the wavelength converter 27 and transmits the light rays BLp, which are each formed of the P-polarization component (second polarization component) of the excitation light BL separated by the first phase retarder 28a, to cause the light rays BLp to exit to the diffuser 30. The S-polarization light rays BLs having exited out of the first optical element 25 enter the first focusing optical system 26. The first focusing optical system 26 causes the light rays BLs to converge toward a phosphor 34 of the wavelength converter 27.

In the present embodiment, the first focusing optical system 26 is formed, for example, of a first lens 26a and a second lens 26b. The light rays BLs having exited out of the first focusing optical system 26 is incident in the form of a focused spot on the wavelength converter 27.

The wavelength converter 27 includes a reflection layer 37, the phosphor (wavelength conversion layer) 34 provided on the light incident side of the reflection layer 37, a substrate 35, which supports the phosphor 34, and a fixing member 36, which fixes the phosphor 34 to the substrate 35. That is, the wavelength converter 27 in the present embodiment is a fixed wavelength converter in which the region on which the excitation light BL is incident does not change over time.

In the present embodiment, the phosphor 34 is fixed to the substrate 35 via the fixing member 36 provided between the side surface of the phosphor 34 and the substrate 35. The phosphor 34 is in contact with the substrate 35 on the side opposite from the side on which the light rays BLs are incident.

The phosphor 34 contains a phosphor that absorbs the light rays BLs and is excited thereby. The phosphor 34 in the present embodiment contains a plurality of scatterers K. The scatterers K are pores or light transmissive particles having a refractive index different from that of the phosphor 34. The phosphor 34 has a surface 34a coated with an antireflection film 39, such as an AR coating.

The phosphor 34 converts the light rays BLs in terms of wavelength to generate and output the fluorescence (yellow fluorescence) YL having a wavelength band ranging, for example, from 500 to 700 nm. In the present embodiment, the phosphor 34 converts the light rays BLs, which are part of the excitation light BL, in terms of wavelength to generate the fluorescence (wavelength converted light) YL having a wavelength band different from that of the excitation light BL. The reflection layer 37 reflects components of the fluorescence YL generated by the phosphor 34 that travel toward the substrate 35.

A heat sink 38 is disposed on a surface of the substrate 35 that is the surface opposite from the surface that supports the phosphor 34. The wavelength converter 27 can dissipate heat via the heat sink 38, whereby thermal degradation of the phosphor 34 can be suppressed.

Part of the fluorescence YL generated by the phosphor 34 is reflected off the reflection layer 37 and exits out of the phosphor 34. The other part of the fluorescence YL generated by the phosphor 34 exits out of the phosphor 34 without traveling via the reflection layer 37. The fluorescence YL thus exits out of the phosphor 34.

The fluorescence YL emitted from the phosphor 34 is unpolarized light. The fluorescence YL passes through the first focusing optical system 26 and is then incident on the first optical element 25. The fluorescence YL passes through the first optical element 25 and travels toward the lens integrator 31.

On the other hand, the light rays BLp, which are each formed of the P-polarization component of the excitation light BL having exited out of the first optical element 25, enter the second phase retarder 28b. The second retarder 28b is formed of a quarter wave plate disposed in the optical path between the first optical element 25 and the diffuser 30. The P-polarization light rays BLp having exited out of the first optical element 25 are therefore converted by the second phase retarder 28b, for example, into right-handed circularly polarized blue light BLc1, which then enter the second focusing optical system 29.

The second focusing optical system 29 is formed, for example, of a lens 29a and causes the blue light BLc1 to be incident in the form of a focused spot on the diffuser 30.

The diffuser 30 is disposed on the opposite side of the first optical element 25 from the wavelength converter 27 and diffusively reflects the blue light BLc1 having exited out of the second focusing optical system 29 toward the first optical element 25. The diffuser 30 preferably reflects the blue light BLc1 in the Lambertian reflection scheme but does not disturb the polarization state thereof. The diffuser 30 may instead have a configuration in which a disc-shaped diffusive reflector is rotated.

The light diffusively reflected off the diffuser 30 is hereinafter referred to as blue light BLc2. According to the present embodiment, the diffusively reflected blue light BLc1 forms the blue light BLc2 having a substantially uniform illuminance distribution. For example, the right-handed circularly polarized blue light BLc1 is reflected in the form of left-handed circularly polarized blue light BLc2. The blue light BLc2 is converted by the second focusing optical system 29 into parallelized light, which then enters the second phase retarder 28*b* again.

The left-handed circularly polarized blue light BLc2 is converted by the second phase retarder 28*b* into S-polarization blue light BLs1. The S-polarization blue light BLs1 is reflected off the first optical element 25 toward the lens integrator 31.

Part of the light rays BLs incident as the excitation light on the phosphor 34 are reflected off the phosphor 34 and exit out of the phosphor 34 via the surface 34*a* thereof. Part of the light rays BLs that exit via the surface 34*a* of the phosphor 34 are hereinafter referred to as "reflected light Br".

The reflected light Br that exits via the surface 34*a* of the phosphor 34 includes, for example, a component that is reflected off the surface 34*a* of the phosphor 34, a component that is scattered in the phosphor 34 and exits via the surface 34*a*, and a component that is not converted into the fluorescence YL in the phosphor 34 but is reflected off the reflection layer 37 and exits via the surface 34*a*.

The reflected light Br having exited via the surface 34*a* of the phosphor 34 as described above is unpolarized light that is a mixture of the S-polarization component and the P-polarization component with respect to the first optical element 25. Out of the reflected light Br, the S-polarization component is referred to as reflected light Brs, and the P-polarization component is referred to as reflected light Brp.

The reflected light Br outputted from the phosphor 34 enters the first optical element 25 via the first focusing optical system 26, as shown in FIG. 2. The reflected light Brp, which is formed of the P-polarization component, passes through the first optical element 25.

In the present embodiment, the first optical element 25 causes the blue light BLs1 incident from the diffuser 30 and the fluorescence YL and the reflected light Brp incident from the wavelength converter 27 to exit in the same direction. The blue light BLs1, the fluorescence YL, and the reflected light Brp are therefore combined with one another by the first optical element 25 into the white illumination light WL.

On the other hand, the reflected light Brs, which is formed of the S-polarization component, is reflected off the first optical element 25 and caused to return toward the light source 20. In the present embodiment, at least part of the reflected light Brs reflected off the first optical element 25 is incident on the second optical element 24.

Figure 3:
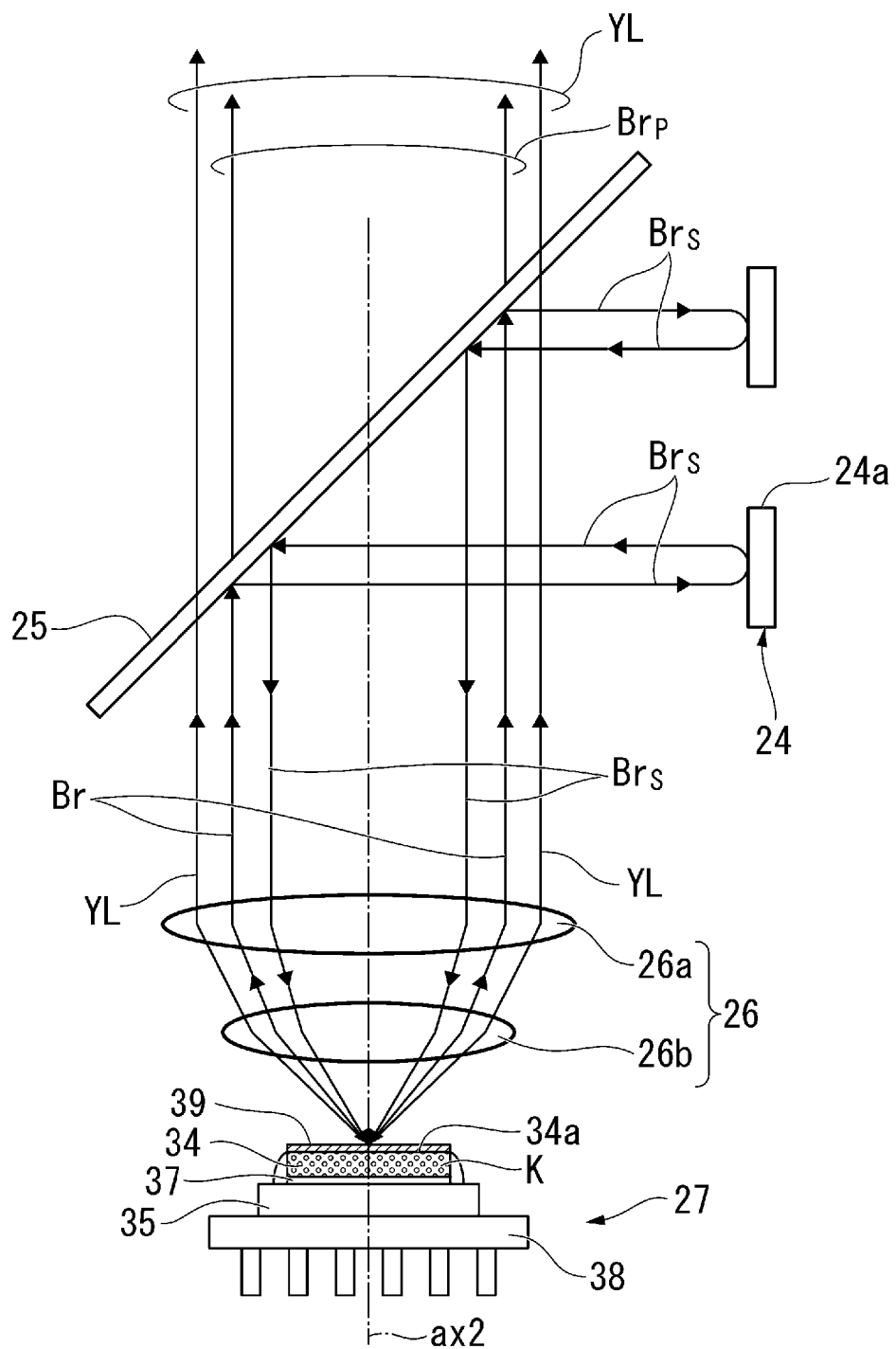
FIG. 3 describes the function performed by a second optical element.

FIG. 3 describes the function performed by the second optical element 24.

The second optical element 24 reflects the reflected light Brs toward the wavelength converter 27, as shown in FIG. 3. The reflected light Brs reflected off the second optical element 24 is reflected off the first optical element 25, incident again on the wavelength converter 27 via the first focusing optical system 26, and reused to excite the phosphor for generation of the fluorescence YL.

Out of the reflected light Brs incident on the second optical element 24, the component having passed through the aperture 24*a* cannot return toward the phosphor 34, resulting in optical loss.

For example, the reflected light Brs specularly reflected off the surface 34*a* of the phosphor 34 traces back the same optical path along which the incoming reflected light Brs travels and passes through the aperture 24*a*, resulting in a loss.

In contrast, the phosphor 34 in the present embodiment, the surface 34*a* of which is coated with the antireflection film 39, such as an AR coating, allows suppression of the component specularly reflected as the reflected light Brs off the surface 34*a* of the phosphor 34. The excitation light BL is therefore allowed to efficiently enter the phosphor 34, whereby the specularly reflected component of the reflected light Brs, the component that can result in a loss, can be reduced.

Furthermore, the phosphor 34 in the present embodiment employs the structure containing a plurality of scatterers K. Providing the phosphor 34 with the scatterers K therein allows the excitation light BL to be scattered in the phosphor 34, whereby the component that traces back as the reflected light Brs the same optical path along which the incoming reflected light Brs travels can be reduced. The loss of the reflected light Brs can thus be reduced, whereby the efficiency at which the excitation light BL is used can be improved.

Furthermore, the reflected light Brs that is not converted into the fluorescence YL in the phosphor 34 but is reflected off the reflection layer 37 and exits via the surface 34*a* traces back the same optical path along which the incoming reflected light Brs travels, is likely to pass through the aperture 24*a* and result in a loss. The present embodiment, in which the scatterers K are provided in the phosphor 34 as described above, allows the excitation light BL to be scattered after reflected off the reflection layer 37 but before exiting via the surface 34*a*. Therefore, suppressing the component that is specularly reflected off the reflection layer 37 and directly passes through the aperture 24*a* allows reduction in the loss of the reflected light Brs and improvement in the efficiency at which the excitation light BL is used.

The illumination light WL as a result of the combination performed by the first optical element 25 enters the lens integrator 31. The lens integrator 31 includes a first multi-lens 31*a* and a second multi-lens 31*b*. The first multi-lens 31*a* includes a plurality of first lenslets 31*am*, which divide the illumination light WL into a plurality of sub-light ray fluxes.

The lens surface of the first multi-lens 31*a* (surfaces of first lenslets 31*am*) is conjugate with an image formation region of each of the light modulators 4R, 4G, and 4B. The first lenslets 31*am* therefore each have a shape (rectangular shape) substantially similar to the shape of the image formation region of each of the light modulators 4R, 4G, and 4B. The sub-luminous fluxes having exited out of the first multi-lens 31*a* are thus each efficiently incident on the image formation region of each of the light modulators 4R, 4G, and 4B.

The second multi-lens 31*b* includes a plurality of second lenslets 31*bm* corresponding to the plurality of first lenslets 31*am* of the first multi-lens 31*a*. The second multi-lens 31*b* along with the superimposing lens 33 brings images of the first lenslets 31*am* of the first multi-lens 31*a* into focus in the vicinity of the image formation region of each of the light modulators 4R, 4G, and 4B.

The illumination light WL having passed through the lens integrator 31 enters the polarization converter 32. The polarization converter 32 has a configuration in which polarization separation films and retardation films (half wave plates) are arranged in an array. The polarization converter 32 aligns the polarization directions of the illumination light WL with a predetermined direction. More specifically, the polarization converter 32 causes the polarization directions of the illumination light WL to coincide with the direction of the transmission axis of the polarizer (not shown) disposed on the light incident side of each of the light modulators 4R, 4G, and 4B. The polarization directions of the red light LR, the green light LG, and the blue light LB separated from the illumination light WL as described above thus coincide with the direction of the transmission axis of the light-incident-side polarizers for the light modulators 4R, 4G, and 4B. The red light LR, the green light LG, and the blue light LB are therefore satisfactorily guided to the image formation regions of the light modulators 4R, 4G, and 4B, respectively, without being blocked by the light-incident-side polarizers.

The illumination light WL having passed through the polarization converter 32 enters the superimposing lens 33. The superimposing lens 33 cooperates with the lens integrator to homogenize the illuminance distribution of the illumination light WL in the illumination receiving regions.

Effects of the present embodiment will be described below.

The light source apparatus 2 according to the present embodiment includes the light source 20, which outputs the excitation light BL, the wavelength converter 27 including the reflection layer 37 and the phosphor 34, which is provided on the light incident side of the reflection layer 37 and converts the excitation light BL in terms of wavelength into the fluorescence YL having a wavelength band different from that of the excitation light BL, the first optical element 25, which causes the excitation light BL from the light source 20 to be incident on the wavelength converter 27, and the second optical element 24, which is disposed in the optical path between the light source 20 and the wavelength converter 27 and causes at least part of the reflected light Br of the excitation light BL outputted from the wavelength converter 27 to exit toward the wavelength converter 27.

In the light source apparatus 2 according to the present embodiment, the second optical element 24, which is provided between the light source 20 and the wavelength converter 27, allows the reflected light Brs, which is part of the reflected light Br outputted from the phosphor 34, to be incident again on the wavelength converter 27 and reused to excite the phosphor 34 for generation of the fluorescence YL. The amount of excitation light incident on the wavelength converter 27 thus increases, so that the amount of fluorescence YL as a result of the conversion performed by the wavelength converter 27 increases, whereby bright fluorescence YL can be generated. It is therefore not necessary to increase the output power of the light source 20 in order to compensate for the decrease in the amount of emitted fluorescence YL due to the stray light component of the excitation light BL, whereby the heat dissipation structure of the light source 20 can be simplified.

The light source apparatus 2 according to the present embodiment therefore allows suppression of the stray light of the excitation light BL to increase the amount of fluorescence YL as a result of the conversion performed by the wavelength converter 27, whereby the light source apparatus 2 can output high-power illumination light WL with an increase in the size of the apparatus suppressed.

In the light source apparatus 2 according to the present embodiment, the second optical element 24 is disposed around the primary luminous flux of the excitation light BL outputted from the light source 20.

According to the configuration described above, the second optical element 24 is disposed so as not to block the primary luminous flux of the excitation light BL, whereby the excitation light BL is allowed to be efficiently incident on the wavelength converter 27.

The light source apparatus 2 according to the present embodiment further includes the afocal optical system 22, which is disposed in the optical path between the light source 20 and the first optical element 25 and reduces the luminous flux diameter of the excitation light BL, and the second optical element 24 has the aperture 24a and is so disposed that the aperture 24a is located around the excitation light BL having a luminous flux diameter reduced by the afocal optical system 22.

According to the configuration described above, the size of the aperture 24a, through which the excitation light BL passes, can be reduced. The loss of the reflected light Br due to the stray light component that passes through the aperture 24a and returns to the light source 20 can thus further be reduced.

The light source apparatus 2 according to the present embodiment further includes the diffuser 30, which is disposed on the opposite side of the first optical element 25 from the wavelength converter 27 and diffuses part of the excitation light BL from the light source 20, and the first phase retarder 28a, which is disposed between the light source 20 and the first optical element 25 and separates the excitation light BL from the light source 20 into the light rays BLs each formed of the S-polarization component and the light rays BLp each formed of the P-polarization component, and the first optical element 25 has the polarization separation function of outputting the light rays BLs of the excitation light BL, which have been separated by the first phase retarder 28a, to the wavelength converter 27 and the light rays BLp of the excitation light BL, which have been separated by the first phase retarder 28a, to the diffuser 30.

According to the configuration described above, rotating the first phase retarder 28a allows adjustment of the ratio between the excitation light BL separated toward the wavelength converter 27 and the excitation light BL separated toward the diffuser 30. The ratio between the amount of fluorescence YL emitted from the wavelength converter 27 and the amount of blue light BLs1 outputted from the diffuser 30 can be controlled, whereby the color balance (white balance) of the illumination light WL can be controlled.

In the light source apparatus 2 according to the present embodiment, the wavelength converter 27 is a fixed wavelength converter in which the region on which the excitation light BL is incident does not change over time.

According to the configuration described above, in which the fixed wavelength converter 27 is used, the size of the light source device 2 can be reduced.

The projector 1 according to the present embodiment includes the light source apparatus 2, the light modulators 4R, 4G, and 4B, which modulate the light from the light source apparatus 2 in accordance with image information, and the projection optical apparatus 6, which projects the light modulated by the light modulators 4R, 4G, and 4B.

The projector 1 according to the present embodiment, which includes the light source apparatus 2, which outputs high-power illumination light WL with the size of the apparatus suppressed, has a small size but can still project a bright image.

Second Embodiment

The light source apparatus according to a second embodiment will be subsequently described. The light source apparatus according to the present embodiment differs from the light source apparatus 2 according to the first embodiment in terms of the positional relationship of the wavelength converter and the diffuser with the first optical element. The following description will be primarily made of the positional relationship of the wavelength converter and the diffuser with the first optical element. It is noted that members common to those in the embodiment described above have the same reference characters and will not be described in detail.

Figure 4:
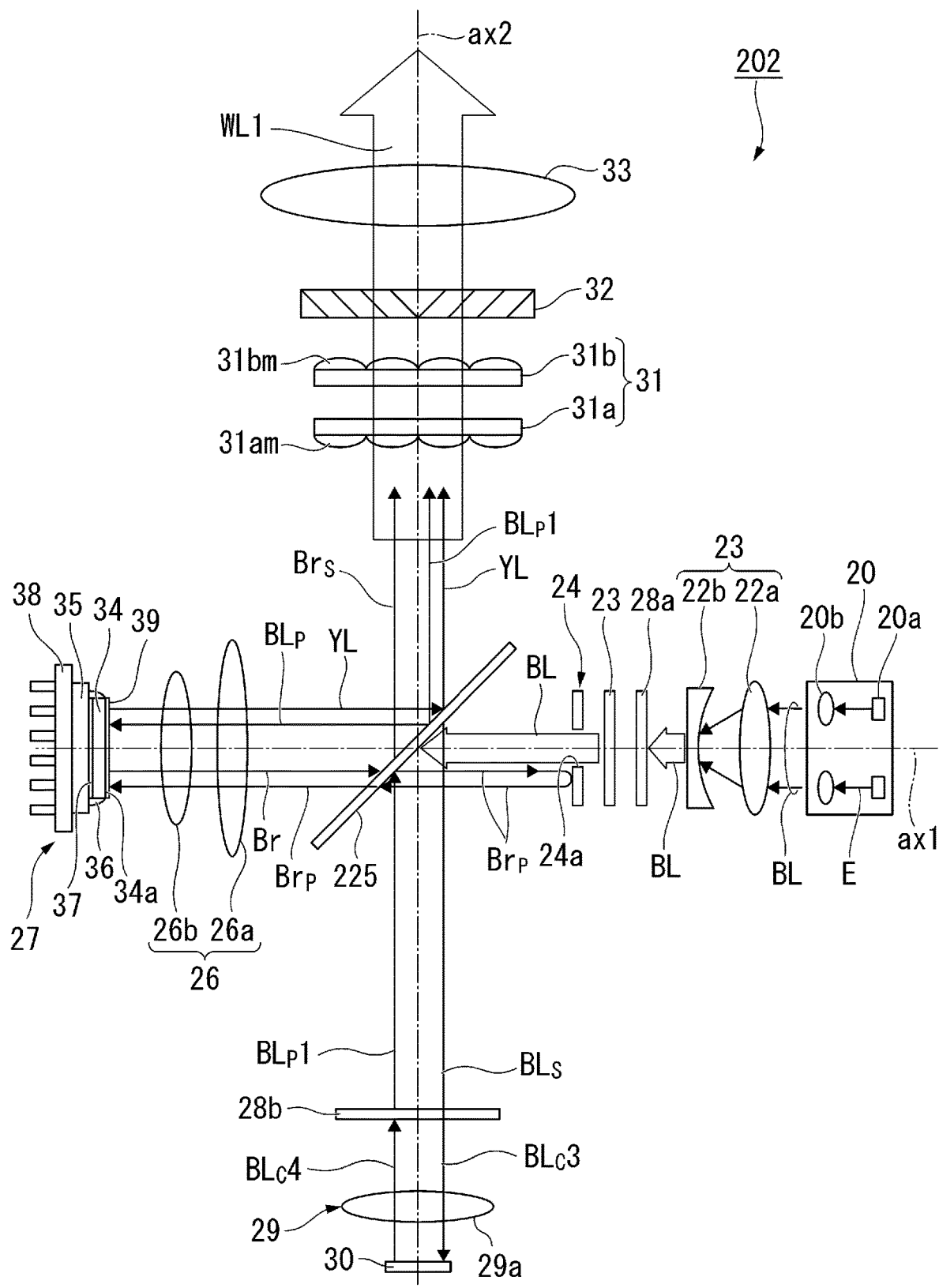
FIG. 4 shows a schematic configuration of the light source apparatus according to a second embodiment.

FIG. 4 shows a schematic configuration of a light source apparatus 202 according to the present embodiment.

The light source apparatus 202 according to the present embodiment includes the light source 20, the afocal optical system 22, the diffusion plate 23, the first phase retarder 28a, a first optical element 225, the second optical element 24, the first focusing optical system 26, the wavelength converter 27, the second phase retarder 28b, the second focusing optical system 29, the diffuser 30, the lens integrator 31, the polarization converter 32, and the superimposing lens 33, as shown in FIG. 4.

In the present embodiment, the light source 20, the afocal optical system 22, the first phase retarder 28a, the diffusion plate 23, the first optical element 225, the first focusing optical system 26, and the wavelength converter 27 are sequentially arranged along the optical axis ax1. The diffuser 30, the second focusing optical system. 29, the second phase retarder 28b, the first optical element 225, the lens integrator 31, the polarization converter 32, and the superimposing lens 33 are sequentially arranged along the illumination optical axis ax2.

The first optical element 225 in the present embodiment reflects the light rays BLs, which are each formed of the S-polarization component (first polarization component) of the excitation light BL separated by the first phase retarder 28a, to cause the light rays BLs to exit to the diffuser 30 and transmits the light rays BLp, which are each formed of the P-polarization component (second polarized component) of the excitation light BL separated by the first phase retarder 28a, to cause the light rays BLp to exit to the wavelength converter 27. The first optical element 225 in the present embodiment reflects the fluorescence YL irrespective of the polarization state thereof.

In the present embodiment, the light rays BLs, which are each formed of the S-polarization component of the excitation light BL having exited out of the first optical element 225, are converted by the second phase retarder 28b, for example, into left-handed circularly polarized blue light BLc3, which are then focused by the second focusing optical system 29 and incident on the diffuser 30.

The left-handed circularly polarized blue light BLc3 is diffusively reflected off the diffuser 30 and exits as, for example, right-handed circularly polarized blue light BLc4, which is converted by the second focusing optical system 29 into parallelized light and enters the second phase retarder 28b again. The right-handed circularly polarized blue light BLc4 is converted by the second phase retarder 28b into P-polarization blue light BLp1. The P-polarization blue light BLp1 passes through the first optical element 225 toward the lens integrator 31.

In the present embodiment, out of the reflected light Br outputted from the phosphor 34, the reflected light Brs, which is formed of the S-polarization component, is reflected off the first optical element 225. The blue light BLp1, the fluorescence YL, and the reflected light Brs are therefore combined with one another by the first optical element 225 into illumination light WL1.

In the present embodiment, out of the reflected light Br outputted from the phosphor 34, the reflected light Brp, which is formed of the P-polarization component, passes through the first optical element 225 and returns toward the light source 20. According to the present embodiment, at least part of the reflected light Brp having passed through the first optical element 225 is reflected off the second optical element 24 and enters the wavelength converter 27 again, so that the reflected light Brp can be reused to excite the phosphor for generation of the fluorescence YL.

Effects of Second Embodiment

As described above, the light source apparatus 202 according to the present embodiment also allows suppression of the stray light of the excitation light BL to increase the amount of fluorescence YL as a result of the conversion performed by the wavelength converter 27, whereby the light source apparatus 202 can output high-power illumination light WL with an increase in the size of the apparatus suppressed, as the light source apparatus 2 according to the first embodiment.

Third Embodiment

The light source apparatus according to a third embodiment will be subsequently described. The light source apparatus according to the present embodiment differs from the light source apparatus 2 according to the first embodiment in terms of the arrangement of the second optical element. The position and configuration of the second optical element will be primarily described below. It is noted that members common to those in the embodiments described above have the same reference characters and will not be described in detail.

Figure 5:
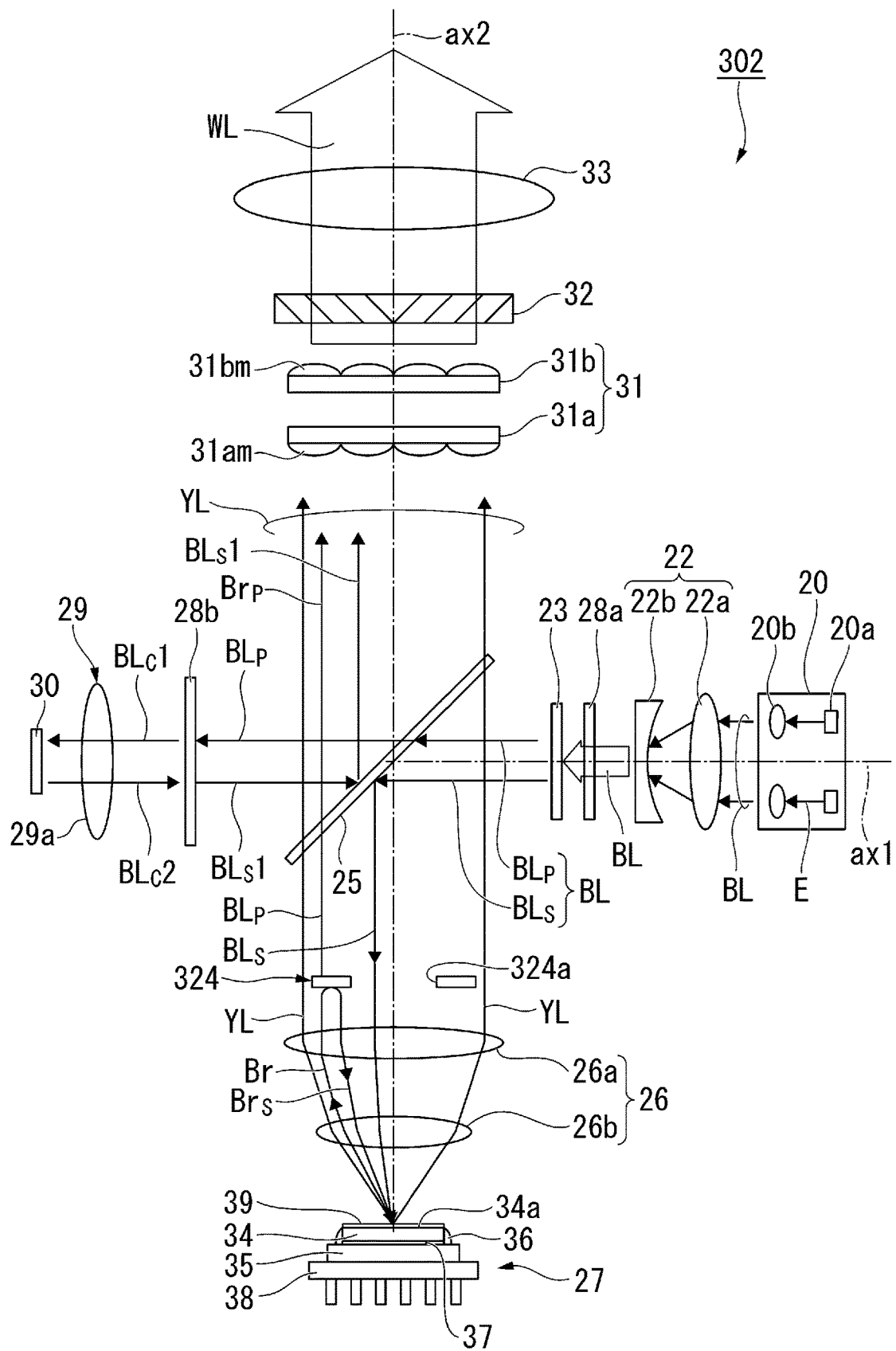
FIG. 5 shows a schematic configuration of the light source apparatus according to a third embodiment.

FIG. 5 shows a schematic configuration of a light source apparatus 302 according to the present embodiment.

The light source apparatus 202 according to the present embodiment includes the light source 20, the afocal optical system 22, the diffusion plate 23, the first phase retarder 28a, a second optical element 324, the first optical element 25, the first focusing optical system 26, the wavelength converter 27, the second phase retarder 28b, the second focusing optical system 29, the diffuser 30, the lens integrator 31, the polarization converter 32, and the superimposing lens 33, as shown in FIG. 5.

In the present embodiment, the light source 20, the afocal optical system 22, the first phase retarder 28a, the diffusion plate 23, the first optical element 25, the second phase retarder 28b, the second focusing optical system 29, and the diffuser 30 are sequentially arranged along the optical axis ax1. The wavelength converter 27, the first focusing optical system 26, the second optical element 324, the first optical element 25, the lens integrator 31, the polarization converter 32, and the superimposing lens 33 are sequentially arranged along the illumination optical axis ax2.

The second optical element 324 in the present embodiment is disposed in the optical path between the first optical element 25 and the wavelength converter 27. The second optical element 324 has an opening 324a. The opening 324a has, for example, a circular planar shape.

The second optical element 324 is disposed so as not to block the primary luminous flux of the excitation light BL outputted from the light source 20. In the present embodiment, the excitation light BL enters the wavelength converter 27 via the aperture 324a provided in the second optical element 324. The excitation light BL is thus incident on the wavelength converter 27 without being blocked by the second optical element 324.

The second optical element 324 reflects at least part of the reflected light Br of the excitation light BL out of the light outputted from the wavelength converter 27 and transmits the fluorescence YL. The second optical element 324 in the present embodiment has a polarization separation function of reflecting the reflected light (first polarization component) Brs, which is formed of the S-polarization component, out of the reflected light Br and transmitting the reflected light (second polarization component) Brp, which is formed of the P-polarization component, out of reflected light Br. The second optical element 324 is formed of a plate-shaped polarization separator similar to the first optical element 25.

In the present embodiment, the fluorescence YL emitted from the wavelength converter 27 passes through the second optical element 324 and is therefore used at the first optical element 25 to generate the illumination light WL.

On the other hand, in the present embodiment, when the reflected light Br of the excitation light BL outputted from the wavelength converter 27 is incident on the second optical element 324, the reflected light Brs is reflected off the second optical element 324, enters the wavelength converter 27 via the first focusing optical system 26, and is reused to excite the phosphor for generation of the fluorescence YL. The reflected light Brp passes through the second optical element 324 and is incident on the first optical element 25. The reflected light Brp is formed of the P-polarization component with respect to the first optical element 25 and therefore passes through the first optical element 25.

Although not illustrated, part of the reflected light Br of the excitation light BL is incident on the first optical element 25 via the aperture 324a of the second optical element 324, whereas the P-polarization component of the reflected light Br passes through the first optical element 25 and used as illumination light WL.

In the present embodiment, the first optical element 25 causes the blue light BLs1 incident from the diffuser 30 and the fluorescence YL and the reflected light Brp incident from the wavelength converter 27 to exit in the same direction. The blue light BLs1, the fluorescence YL, and the reflected light Brp are therefore combined with one another by the first optical element 25 into the white illumination light WL.

If the second optical element 324 is replaced with a half-silvered mirror, the reflected light Brp contained in the reflected light Br having passed through the second optical element 324 passes through the first optical element 25 and can be used as the illumination light WL, but the reflected light Brs is reflected off the first optical element 25 and returns toward the light source 20, so that the reflected light Brs cannot be used as the illumination light WL.

In contrast, the light source apparatus 302 according to the present embodiment, in which the second optical element 324 having the polarization separation function is provided in the optical path between the first optical element 25 and the wavelength converter 27, allows the reflected light Brs to be used to re-excite the phosphor for generation of the fluorescence YL and the reflected light Brp to be used as the illumination light WL. The light source apparatus 302 according to the present embodiment therefore allows suppression of the stray light of the excitation light BL to increase the amount of fluorescence YL as a result of the conversion performed by the wavelength converter 27, whereby the light source apparatus 302 can output high-power illumination light WL with an increase in the size of the apparatus suppressed.

Fourth Embodiment

The light source apparatus according to a fourth embodiment will be subsequently described. The light source apparatus according to the present embodiment differs from the light source apparatus 2 according to the first embodiment in terms of the configuration of the first optical element. The first optical element and configurations associated therewith will be primarily described below. It is noted that members common to those in the embodiments described above have the same reference characters and will not be described in detail.

Figure 6:
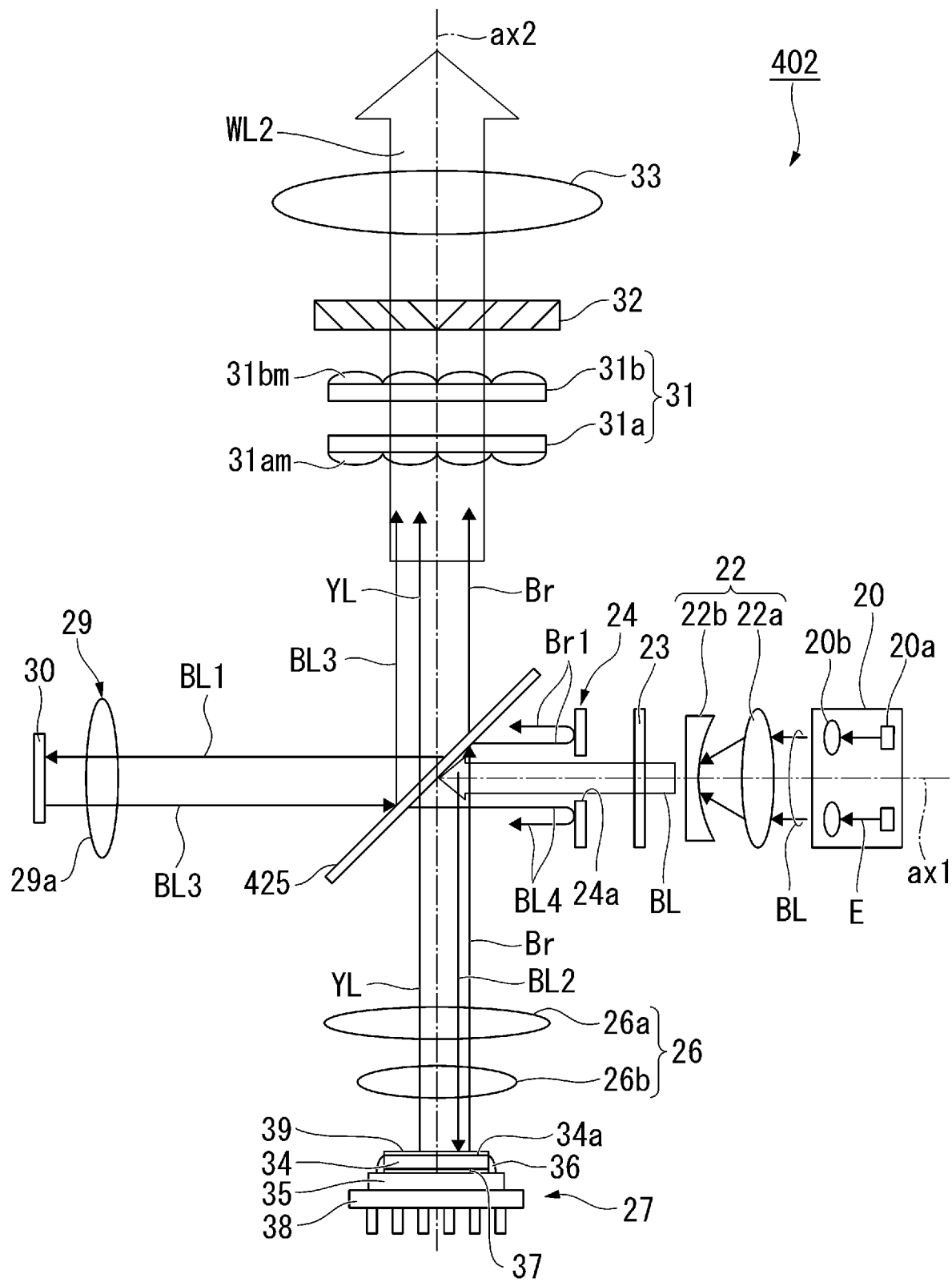
FIG. 6 shows a schematic configuration of the light source apparatus according to a fourth embodiment.

FIG. 6 shows a schematic configuration of a light source apparatus 402 according to the present embodiment.

The light source device 402 according to the present embodiment includes the light source 20, the afocal optical system 22, the diffusion plate 23, the second optical element 24, a first optical element 425, the first focusing optical system 26, the wavelength converter 27, the second focusing optical system 29, the diffuser 30, the lens integrator 31, the polarization converter 32, and the superimposing lens 33, as shown in FIG. 6.

The first optical element 425 in the present embodiment is a half-silvered mirror that transmits part of the excitation light BL and reflects the other part thereof. In the present embodiment, the half-silvered mirror does not necessarily reflect and transmit the excitation light BL by the same proportion. That is, the first optical element 425 in the present embodiment is an optical element that transmits part of the excitation light BL outputted from the light source 20 by a predetermined proportion and reflects the other part of the excitation light BL. For example, the first optical element 425 transmits the excitation light BL at a transmission of 30% and reflects the excitation light BL at a reflectance of 70%. The proportions by which the first optical element 425 reflects and transmits the excitation light BL are selected as appropriate in accordance with the color tone of the illumination light WL generated by the light source apparatus 402.

Since the light source apparatus 402 according to the present embodiment uses the first optical element 425 formed of a half-silvered mirror, the first phase retarder 28a for separating the excitation light BL into the P-polarization and S-polarization components can be omitted, unlike the light source apparatus 2 according to the first embodiment. The second phase retarder 28b for converting the polarization state of the blue light outputted from the diffuser 30 can also be omitted.

In the present embodiment, part of the excitation light BL incident on the first optical element 425 is incident as transmitted light BL1 on the diffuser 30, and the remainder of the excitation light BL is incident as reflected light BL2 on the wavelength converter 27. The transmitted light BL1 is diffused by the diffuser 30 and is incident as blue light BL3 on the first optical element 425 again. The first optical element 425 reflects part of the blue light BL3 to cause the reflected blue light BL3 to exit toward the lens integrator 31.

Furthermore, the first optical element 425 transmits blue light BL4, which is the other part of blue light BL3, to cause the transmitted blue light BL4 to exit toward the light source 20.

In the present embodiment, the blue light BL4 having exited out of the first optical element 425 toward the light source 20 is reflected off the second optical element 24 and separated by the first optical element 425 into a component that travels toward the diffuser 30 and a component that travels toward the wavelength converter 27. At least part of the blue light BL4 having exited out of the first optical element 425 toward the light source 20 is therefore efficiently used to generate the illumination light.

On the other hand, the reflected light BL2 enters the wavelength converter 27. The wavelength converter 27 emits the fluorescence YL and the reflected light Br toward the first optical element 425. The first optical element 425 transmits part of the fluorescence YL and the reflected light Br to cause the transmitted light to exit toward the lens integrator 31. The first optical element 425 reflects the other part of the fluorescence YL and the reflected light Br to cause the reflected light to exit toward the light source 20.

In the present embodiment, reflected light Br1, which is part of the reflected light Br having exited out of the first optical element 425 toward the light source 20, is reflected off the second optical element 24 and separated by the first optical element 425 into a component that travels toward the diffuser 30 and a component that travels toward the wavelength converter 27. At least part of the reflected light Br having exited out of the first optical element 425 toward the light source 20 is therefore efficiently used to generate the illumination light WL.

Although not illustrated, the fluorescence YL having exited out of the first optical element 425 toward the light source 20 is reflected off the second optical element 24 and separated by the first optical element 425 into a component that travels toward the diffuser 30 and a component that travels toward the wavelength converter 27. The fluorescence YL having traveled toward the diffuser 30 is diffusively reflected off the diffuser 30 and is incident on the first optical element 425 again, and part of the fluorescence YL incident on the first optical element 425 is reflected and used as part of the illumination light. The fluorescence YL having been outputted from the diffuser 30 and having passed through the first optical element 425 is again reflected off the second optical element 24 and traces back along the same optical path, so that at least part of the fluorescence YL is eventually extracted as the illumination light.

The fluorescence YL having traveled toward the wavelength converter 27 is diffusively reflected off the wavelength converter 27 and is incident on the first optical element 425 again, and part of the fluorescence YL incident on the first optical element 425 passes therethrough and is used as part of the illumination light. The fluorescence YL emitted from the wavelength converter 27 and reflected off the first optical element 425 is again reflected off the second optical element 24 and traces back along the same optical path, and at least part of the fluorescence YL is eventually extracted as the illumination light.

The light source apparatus 402 according to the present embodiment can thus generate bright illumination light WL2 containing the blue light BL3, the fluorescence light YL, and the reflected light Br with the two phase retarders described above omitted for cost reduction.

Fifth Embodiment

The light source apparatus according to a fifth embodiment will be subsequently described. The light source apparatus according to the present embodiment differs from the light source apparatus 2 according to the first embodiment in terms of the structure of the wavelength converter. The configuration of the wavelength converter will be primarily described below. It is noted that members common to those in the embodiments described above have the same reference characters and will not be described in detail.

Figure 7:
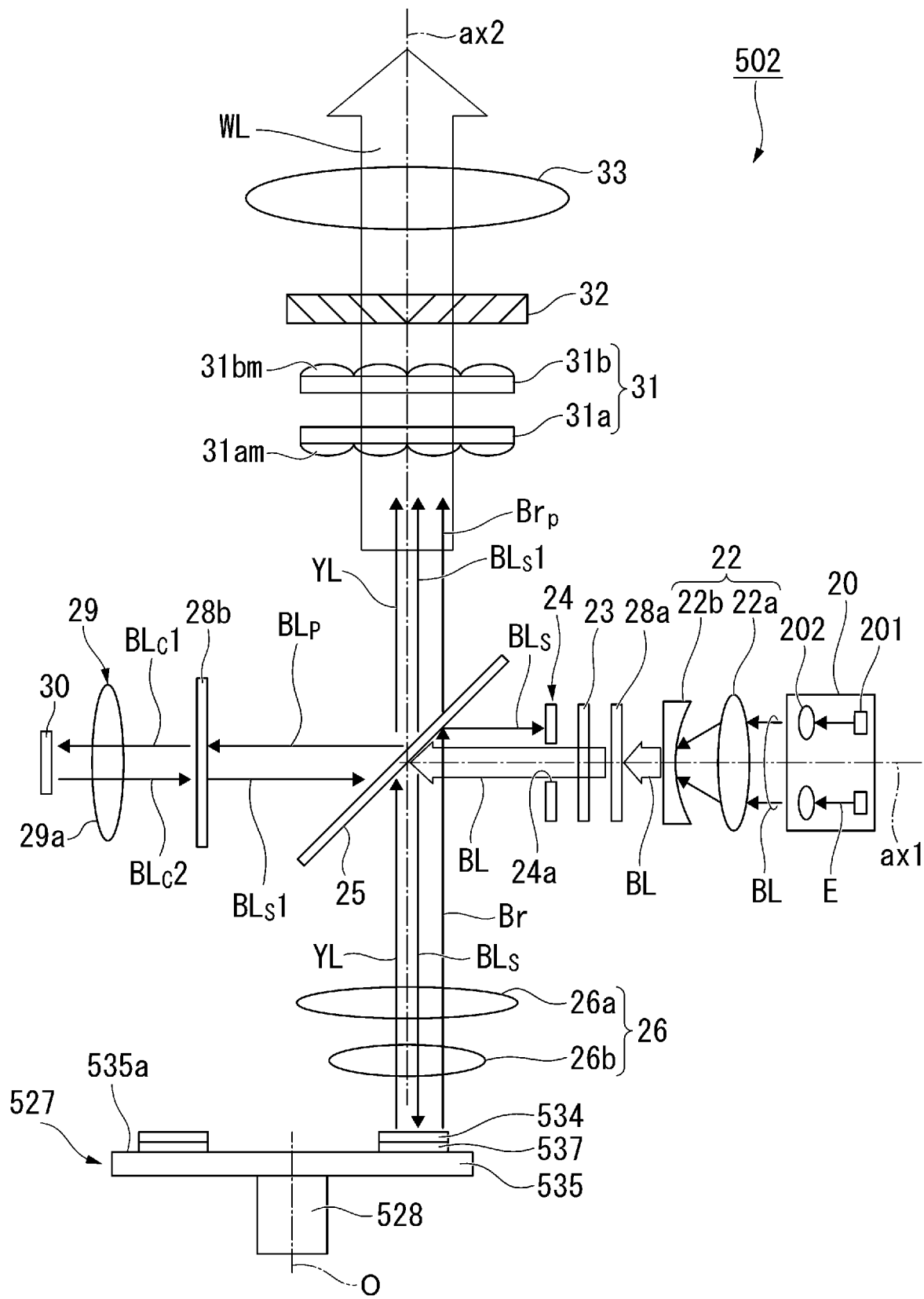
FIG. 7 shows a schematic configuration of the light source apparatus according to a fifth embodiment.

FIG. 7 shows a schematic configuration of a light source apparatus 502 according to the present embodiment.

The light source apparatus 502 includes the light source 20, the afocal optical system 22, the diffusion plate 23, the first phase retarder 28a, the second optical element 24, the first optical element 25, the first focusing optical system 26, a wavelength converter 527, the second phase retarder 28b, the second focusing optical system 29, the diffuser 30, the lens integrator 31, the polarization converter 32, and the superimposing lens 33, as shown in FIG. 7.

The wavelength converter 527 in the present embodiment includes a substrate 535, a phosphor (wavelength conversion layer) 534, a reflection layer 537, and a motor 528. The wavelength converter 527 in the present embodiment is a movable wavelength converter in which the region on which the excitation light BL is incident changes over time.

The substrate 535 is formed, for example, of a disc made of metal that excels in heat dissipation capability, such as aluminum and copper. The substrate 535, which is fixed to the motor 528, is rotatable around an axis of rotation O. The substrate 535 is, for example, a disc but does not necessarily have a circular shape and only needs to be a flat plate.

The phosphor 534 having an annular shape is formed at a surface 535a of the substrate 535. The reflection layer 537 having an annular shape is disposed between the surface 535a of the substrate 535 and the phosphor 534. Heat dissipating fins that enhance the heat dissipation capability may be provided at the rear surface of the substrate 535, the surface opposite from the surface 535a.

In the light source apparatus 502 according to the present embodiment, which includes the movable wavelength converter 527, the substrate 535 can be rotated to changeover time the position where the excitation light BL is incident on the phosphor 534. As a result, the same portion of the phosphor 534 is not constantly irradiated with the excitation light BL, so that the phosphor 534 is not locally heated, whereby a highly reliable light source apparatus 502 with degradation of the phosphor 534 suppressed and a decrease in the fluorescence conversion efficiency of the phosphor 534 suppressed can be provided.

Sixth Embodiment

The light source apparatus according to a sixth embodiment will be subsequently described. The light source apparatus according to the present embodiment differs from the light source apparatus 2 according to the first embodiment in terms of the shape of the second optical element. The position and configuration of the second optical element will be primarily described below. It is noted that members common to those in the embodiments described above have the same reference characters and will not be described in detail.

Figure 8:
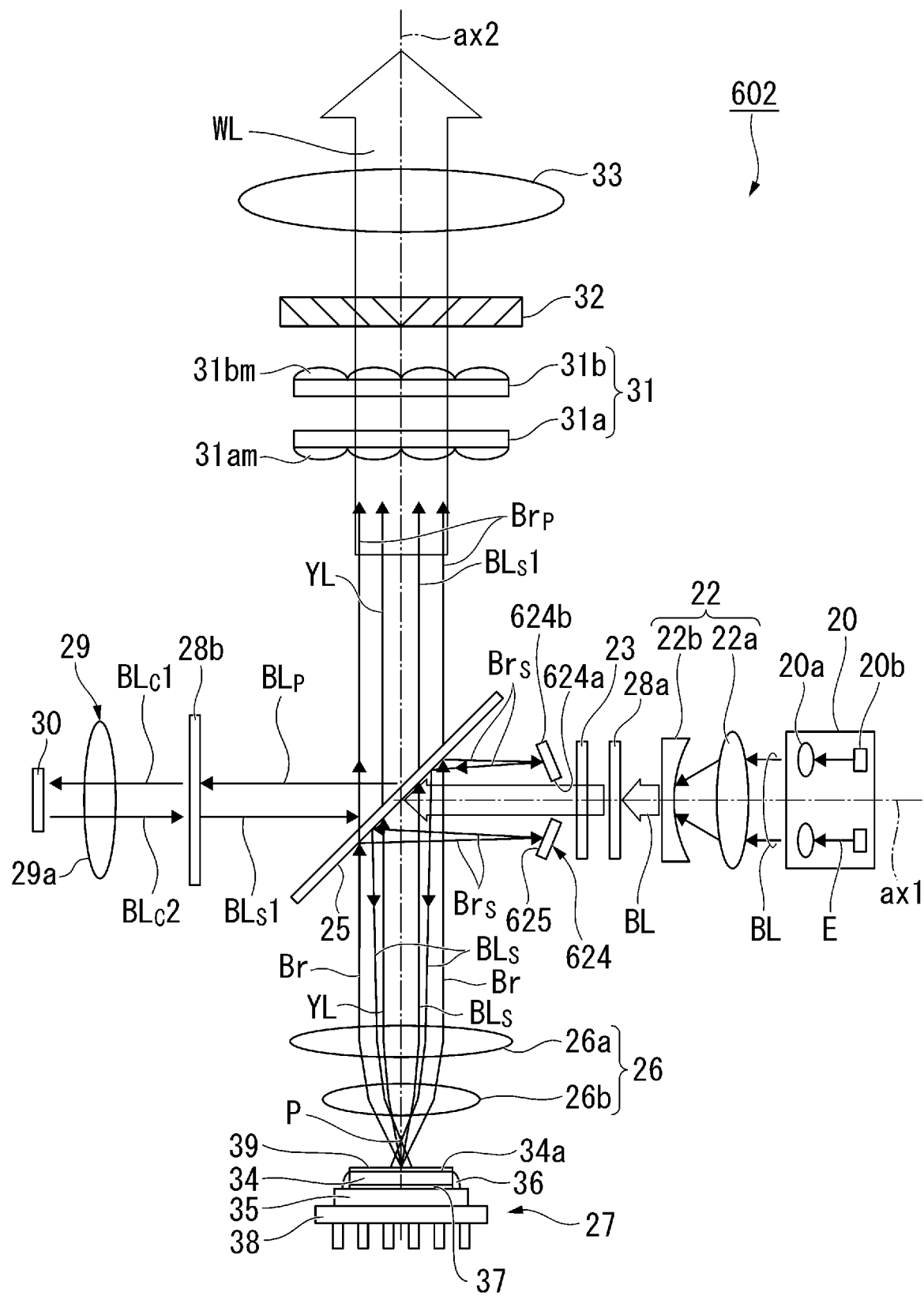
FIG. 8 shows a schematic configuration of the light source apparatus according to a sixth embodiment.

FIG. 8 shows a schematic configuration of a light source apparatus 602 according to the present embodiment.

The light source apparatus 602 according to the present embodiment includes the light source 20, the afocal optical system 22, the diffusion plate 23, the first phase retarder 28a, a second optical element 624, the first optical element 25, the first focusing optical system 26, the wavelength converter 27, the second phase retarder 28b, the second focusing optical system 29, the diffuser 30, the lens integrator 31, the polarization converter 32, and the superimposing lens 33, as shown in FIG. 8.

The second optical element 624 in the present embodiment is formed of a conical tubular mirror having a center axis that coincides with the optical axis ax1. The second optical element 624 has a first opening end 624a and a second opening end 624b arranged along the optical axis ax1. The first opening end 624a faces the light source 20, and the second opening end 624b faces the first optical element 25. The opening diameter of the second opening end 624b is greater than the opening diameter of the first opening end 624a. The second optical element 624 therefore has a reflection surface 625, which inclines gradually away from the optical axis ax1 in the direction from the light source 20 toward the first optical element 25.

The second optical element 624 is disposed so as not to block the primary luminous flux of the excitation light BL outputted from the light source 20. In the present embodiment, the excitation light BL travels via the first aperture end 624a and the second aperture end 624b, which form the ends of the second optical element 624, and enters the wavelength converter 27. The excitation light BL is thus incident on the wavelength converter 27 without being blocked by the second optical element 324.

In the present embodiment, the reflected light Brs, which is part of the reflected light Br reflected off the first optical element 25, is incident on the second optical element 624. The second optical element 624 reflects at least part of the reflected light Brs toward the wavelength converter 27. The second optical element 624 has the reflection surface 625, which inclines toward the optical axis ax1 in the direction toward the light source 20, as described above. The reflected light Br incident on the reflection surface 625 of the second optical element 624 is therefore reflected in a direction toward the optical axis ax1. That is, the second optical element 624 causes the reflected light Brs to exit convergently toward the wavelength converter 27.

Having been reflected off the second optical element 624 exits convergently toward the wavelength converter 27, the reflected light Brs is brought into focus at a focal point P upstream of the surface 34a of the phosphor 34, which is the light incident surface of the wavelength converter 27. The reflected light Brs is therefore incident in the form of a spot wider than the focal point P on the surface 34a of the phosphor 34. On the other hand, the excitation light BL to be incident on the wavelength converter 27 is outputted from the light source 20 so as to be focused at the surface 34a of the phosphor 34, which is the light incident surface of the wavelength converter 27.

Figure 9A:
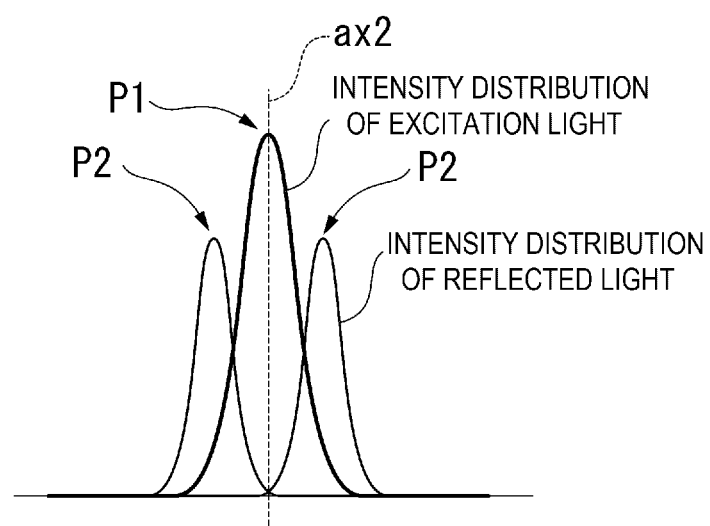
FIG. 9A shows the intensity distributions of two types of light incident on the surface of a phosphor.
Figure 9B:
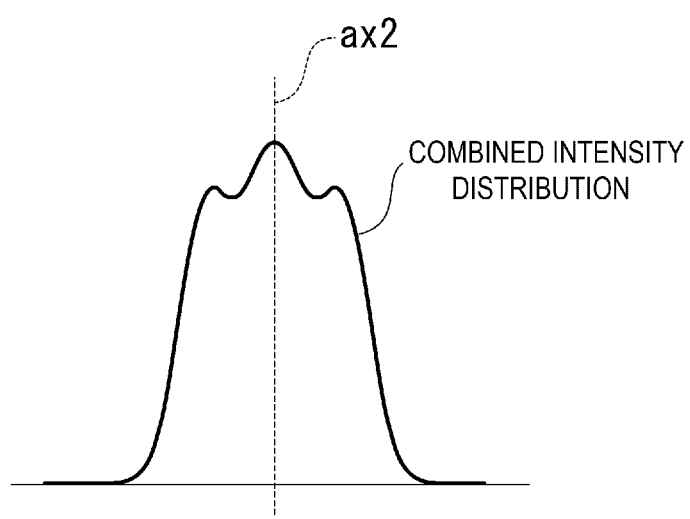
FIG. 9B shows the intensity distribution that is the combination of the intensity distributions in FIG. 9A.

FIG. 9A shows the intensity distributions of the excitation light BL and the reflected light Brs incident on the surface 34a of the phosphor 34. FIG. 9B shows the intensity distribution that is the combination of the intensity distributions of the excitation light BL and the reflected light Brs in FIG. 9A.

Since the excitation light BL is incident on the phosphor 34 so as to be focused at the surface 34a, the intensity distribution of the excitation light BL has a peak P1 on the illumination optical axis ax2, as shown in FIG. 9A. In contrast, the reflected light Brs is incident on the phosphor 34 so as to be brought into focus at the focal point P upstream of the surface 34a or focused in a position upstream of the surface 34a, as described above, so that the intensity distribution of the reflected light Brs has peaks P2 in positions separate from the illumination axis ax2.

In the present embodiment, since the second optical element 624 has the conical tubular reflection surface 625 having a center axis that coincides with the optical axis ax1, the peaks P2 of the intensity distribution of the reflected light Brs are formed on both sides of the peak P1 of the excitation light BL in positions separate by the same distance from the peak P1, as shown in FIG. 9A. Part of the reflected light Brs overlaps with the periphery of the excitation light BL.

That is, in the present embodiment, the second optical element 624 causes the reflected light Brs of the excitation light BL outputted from the wavelength converter 27 to be incident on the surface 34a of the phosphor 34, which is the light incident surface of the wavelength converter 27, in such a way that the peaks P2 of the intensity distribution of the reflected light Brs are shifted from the peak P1 of the intensity distribution of the excitation light BL from the light source 20.

The second optical element 624 in the present embodiment, which shifts the peaks P2 of the intensity distribution of the reflected light Brs from the peak P1 of the intensity distribution of the excitation light BL, can improve the uniformity of the intensity distribution of the light incident as the excitation light on the surface 34a of the phosphor 34, as shown in FIG. 9B.

According to the present embodiment, the conical tubular second optical element 624 is used to improve the uniformity of the intensity distribution of the light incident on the phosphor 34, whereby the thermal degradation of the phosphor 34 can be suppressed. Furthermore, bright illumination light can be generated by suppressing the decrease in the fluorescence conversion efficiency.

Seventh Embodiment

The light source apparatus according to a seventh embodiment will be subsequently described. The light source apparatus according to the present embodiment differs from the light source apparatus 2 according to the first embodiment in terms of the arrangement of the second optical element. The position and configuration of the second optical element will be primarily described below. It is noted that members common to those in the embodiments described above have the same reference characters and will not be described in detail.

Figure 10:
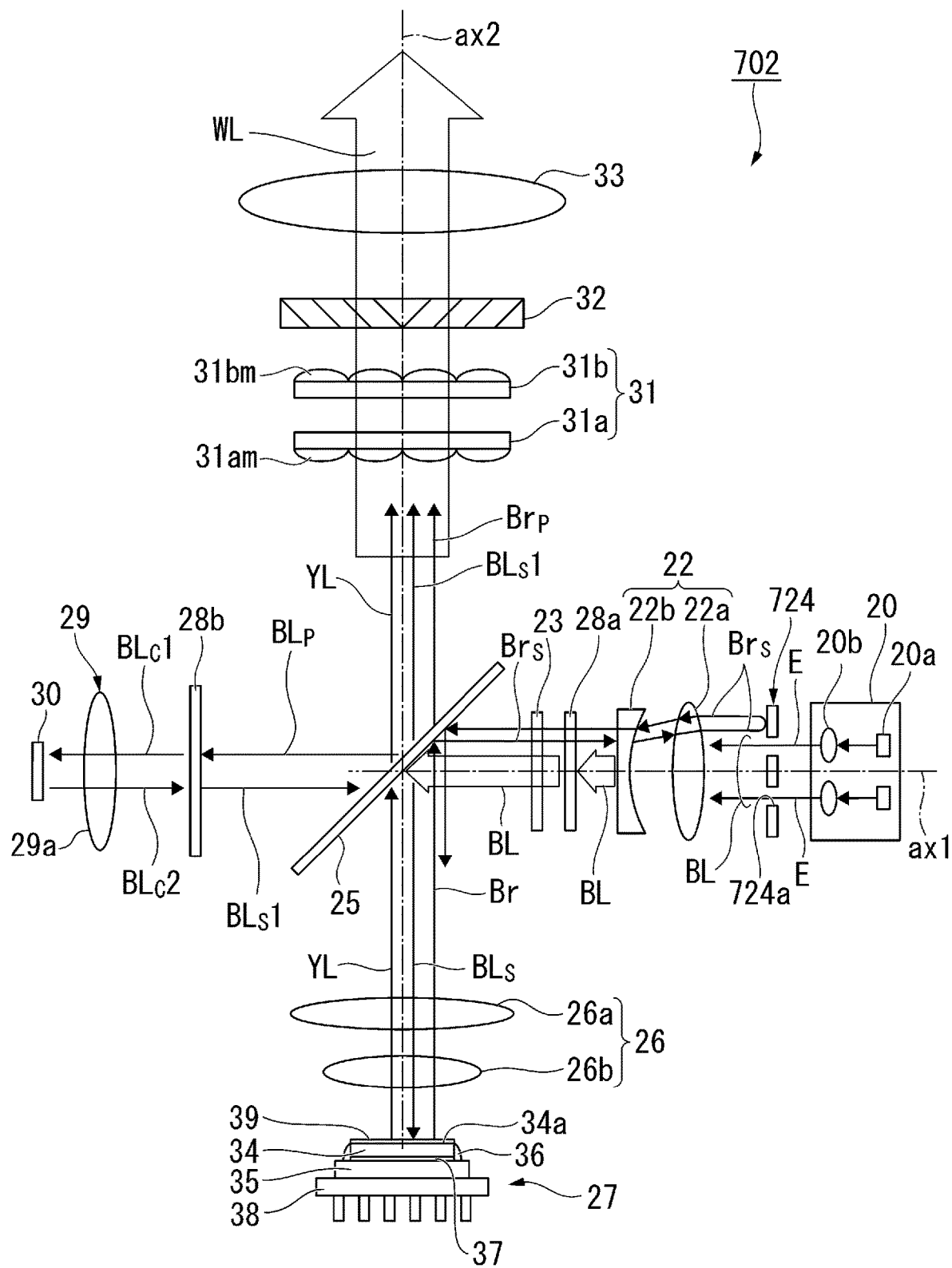
FIG. 10 shows a schematic configuration of the light source apparatus according to a seventh embodiment.

FIG. 10 shows a schematic configuration of a light source apparatus 702 according to the present embodiment.

The light source apparatus 702 according to the present embodiment includes the light source 20, a second optical element 724, the afocal optical system 22, the diffusion plate 23, the first phase retarder 28a, the first optical element 25, the first focusing optical system 26, the wavelength converter 27, the second phase retarder 28b, the second focusing optical system 29, the diffuser 30, the lens integrator 31, the polarization converter 32, and the superimposing lens 33, as shown in FIG. 10.

The excitation light BL outputted from the light source 20 contains two light rays E outputted from two light emitters 20a. That is, the excitation light BL is formed of the two light rays E.

The second optical element 724 is disposed between the light source 20 and the afocal optical system 22. The second optical element 724 in the present embodiment is disposed in the vicinity of the light source 20. The second optical element 724 has two openings 724a, through which the light rays E, which form the excitation light BL, pass. The diameter of each of the apertures 724a is sized so as not to block the light ray E. The apertures 724a each preferably have a planar shape corresponding to the cross-section of the ray E, for example, an elliptical or rectangular shape.

In the present embodiment, in which the second optical element 724 is disposed in a front stage before the afocal optical system 22 reduces the luminous flux diameter of the excitation light B, the apertures 724a corresponding to the light rays E, which form the excitation light BL, are provided, so that the ratio of the apertures to the entire second optical element 724 can be reduced. The second optical element 724, the apertures of which each have a reduced area as described above, can reflect an increased amount of reflected light Brs toward the wavelength converter 27.

According to the present embodiment, even when the position where the second optical element 724 is disposed is restricted to a position in the vicinity of the light source 20, the excitation light BL can be efficiently used by causing the reflected light Brs to be efficiently incident on the wavelength converter 27.

Eighth Embodiment

The light source apparatus according to an eighth embodiment will be subsequently described. It is noted that members common to those in the embodiments described above have the same reference characters and will not be described in detail.

Figure 11:
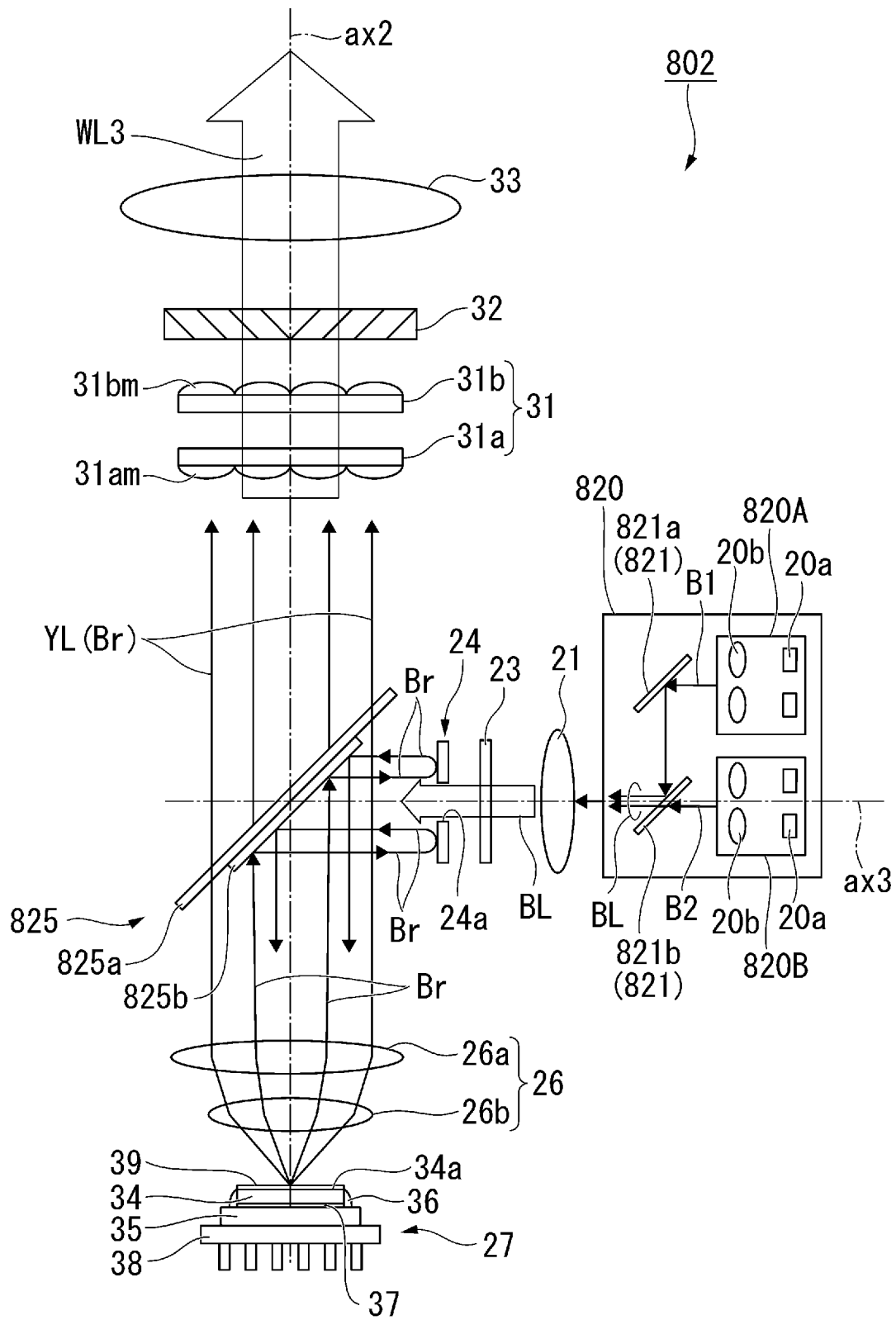
FIG. 11 shows a schematic configuration of the light source apparatus according to an eighth embodiment.

FIG. 11 shows a schematic configuration of a light source apparatus 802 according to the present embodiment.

The light source apparatus 802 according to the present embodiment includes a light source 820, a focusing optical system 21, the diffusion plate 23, the second optical element 24, a first optical element 825, the first focusing optical system 26, the wavelength converter 27, the lens integrator 31, the polarization converter 32, and the superimposing lens 33, as shown in FIG. 11.

In the present embodiment, the light source 820, the focusing optical system. 21, the diffusion plate 23, the second optical element 24, and the first optical element 825 are sequentially arranged along an optical axis ax3 of the light source 820. The wavelength converter 27, the first focusing optical system 26, the first optical element 825, the lens integrator 31, the polarization converter 32, and the superimposing lens 33 are sequentially arranged along the illumination optical axis ax2.

The light source 820 in the present embodiment includes a first light source section 820A, a second light source section 820B, and a luminous flux reducer 821. The first light source section 820A and the second light source section 820B each have the same configuration as that of the light source 20 in the first embodiment but differ from each other in terms of the polarization direction of the light outputted therefrom. That is, the first light source section 820A and the second light source section 820B each include the plurality of light emitting elements 20a and collimation lenses 20b and output light ray fluxes B1 and B2 as parallelized luminous fluxes having the blue wavelength band. The luminous flux reducer 821 includes a mirror 821a and a polarization separation mirror 821b.

The mirror 821a reflects the light ray flux B1 outputted from the first light source section 820A toward the polarization separation mirror 821b. In the present embodiment, the light ray flux B1 outputted from the first light source section 820A is light formed of the S-polarization component with respect to the polarization separation mirror 821b. The light ray flux B1 is reflected off the polarization separation mirror 821b and exits toward the focusing optical system 21.

In the present embodiment, the light ray flux B2 outputted from the second light source section 820B is light formed of the P-polarization component with respect to the polarization separation mirror 821b. The light ray flux B2 passes through the polarization separation mirror 821b and exits toward the focusing optical system 21.

In the thus configured light source 820 in the present embodiment, the luminous flux reducer 821 can reduce the luminous flux width of the light ray flux B1 and light ray flux B2 and cause the ray fluxes to exit toward the focusing optical system 21. In the light source apparatus 802 according to the present embodiment, the excitation light BL containing the light ray flux B1 and the light ray flux B2 BL is outputted from the light source 820.

The focusing optical system 21 includes at least one lens and causes the excitation light BL to exit convergently toward the wavelength converter 27. The excitation light BL having traveled via the focusing optical system 21 is incident on the first optical element 825 via the diffusion plate 23 and the second optical element 24.

The first optical element 825 in the present embodiment includes a light transmissive substrate 825a and an optical layer 825b. The light transmissive substrate 825a is a substrate that transmits light having at least the wavelength band of the fluorescence YL or the excitation light BL. The optical layer 825b is formed of a dichroic mirror that reflects light having the wavelength band of the excitation light BL and transmits light having the wavelength band of the fluorescence YL. The optical layer 825b is provided in the region of part of the light transmissive substrate 825a. The optical layer 825b is provided so as to intersect with the optical axis ax3 and the illumination optical axis ax2.

The excitation light BL having traveled via the second optical element 24 is reflected off the optical layer 825b of the first optical element 825 and incident on the wavelength converter 27. The fluorescence YL emitted from the wavelength converter 27 is incident on the first optical element 825 via the first focusing optical system 26. The fluorescence YL passes through the first optical element 825 and enters the lens integrator 31.

On the other hand, the reflected light Br of the excitation light BL outputted from the wavelength converter 27 is incident on the first optical element 825 via the first focusing optical system 26. At this point, part of the reflected light Br incident on a region of the first optical element 825, the region different from the optical layer 825b, passes through the light transmissive substrate 825a and is incident on the first optical element 825.

Part of the reflected light Br incident on the optical layer 825b of the first optical element 825 is reflected toward the light source 820. Part of the reflected light Br reflected off the first optical element 825 is reflected by the second optical element 24, enters the wavelength converter 27 via the first focusing optical system 26, and is used to re-excite the phosphor for generation of the fluorescence YL.

In the present embodiment, in which the focusing optical system 21 reduces the luminous flux width of the excitation light BL, the size of the optical layer 825b is reduced. The amount of reflected light Br that is incident on the optical layer 825b and exits toward the light source 820 can therefore be suppressed, whereby part of the excitation light BL can be efficiently used as the blue light of the illumination light.

Even in the light source apparatus 802 according to the present embodiment, in which the diffuser 30 is not provided unlike the embodiments described above, the fluorescence YL emitted from the wavelength converter 27 and part of the reflected light Br of the excitation light BL can be used to generate illumination light WL3. Furthermore, the light source apparatus 802 according to the present embodiment, in which the second optical element 24 allows the reflected light Br of the excitation light BL to be used to re-excite the phosphor for generation of the fluorescence YL, can output high-power illumination light with an increase in the size of the apparatus suppressed by suppressing the stray light of the excitation light BL to increase the amount of fluorescence YL generated by the conversion performed by the wavelength converter 27.

The present disclosure has been described with reference to the embodiments by way of example but is not necessarily limited to the embodiments described above, and a variety of changes can be made thereto to the extent that the changes do not depart from the substance of the present disclosure.

For example, the aforementioned embodiments have been described with reference to the case where the scatterers K are provided in the phosphor 34 to reduce the specular reflection component of the excitation light BL. Instead, the surface 34*a* of the phosphor 34 may be provided, for example, with a scattering structure including a plurality of spherical or pyramidal irregularities.

The position where the second optical element is disposed is not limited to the positions in the embodiments described above. For example, the second optical element may be disposed between the convex lens 22*a* and the concave lens 22*b*, which form the afocal optical system 22. The second optical element may still instead be disposed between the diffuser 30 and the afocal optical system 22.

In the embodiments described above, the projector 1 including the three light modulators 4R, 4G, and 4B has been presented by way of example, and the present disclosure is also applicable to a projector that displays color video images via one light modulator. Furthermore, the light modulators are not limited to the liquid crystal panels described above and can instead, for example, be digital mirror devices.

In the embodiments described above, the light source apparatuses according to the present disclosure are each used in a projector by way of example, but not necessarily. The light source apparatuses according to the present disclosure may each be used as a lighting apparatus, such as a headlight of an automobile.

A light source apparatus according to an aspect of the present disclosure may have the configuration below.

The light source apparatus according to the aspect of the present disclosure includes alight source that outputs excitation light, a wavelength converter including a reflection layer and a wavelength conversion layer that is provided on the light incident side of the reflection layer and converts the excitation light in terms of wavelength into wavelength converted light having a wavelength band different from that of the excitation light, a first optical element that causes the excitation light from the light source to be incident on the wavelength converter, and a second optical element that is disposed in the optical path between the light source and the wavelength converter and causes at least part of the reflected light of the excitation light outputted from the wavelength converter to exit toward the wavelength converter.

In the light source apparatus according to the aspect of the present disclosure, the second optical element may be disposed around the primary luminous flux of the excitation light outputted from the light source.

The light source apparatus according to the aspect of the present disclosure may further include a reduction optical system that is disposed in the optical path between the light source and the first optical element and reduces the luminous flux diameter of the excitation light, and the second optical element may have an aperture and may be so disposed that the aperture is located around the excitation light having a luminous flux diameter reduced by the reduction optical system.

In the light source apparatus according to the aspect of the present disclosure, the second optical element may be disposed in the optical path between the first optical element and the wavelength converter and may reflect at least part of the reflected light of the excitation light and transmit the wavelength converted light out of the light outputted from the wavelength converter.

In the light source apparatus according to the aspect of the present disclosure, the second optical element may have a polarization separation function of reflecting a first polarization component out of the reflected light and transmitting a second polarization component out of the reflected light.

In the light source apparatus according to the aspect of the present disclosure, the second optical element may cause the reflected light of the excitation light outputted from the wavelength converter to be incident on the light incident surface of the wavelength converter in such a way that the peak of the intensity distribution of the reflected light is shifted from the peak of the intensity distribution of the excitation light from the light source.

The light source apparatus according to the aspect of the present disclosure may further include a diffuser that is disposed on the opposite side of the first optical element from the wavelength converter and diffuses part of the excitation light from the light source and a phase retarder that is disposed between the light source and the first optical element and separates the excitation light from the light source into the first polarization component and the second polarization component, and the first optical element may have the polarization separation function of outputting the first polarization component of the excitation light separated by the phase retarder to the wavelength converter and the second polarization component of the excitation light separated by the phase retarder to the diffuser.

In the light source apparatus according to the aspect of the present disclosure, the first optical element may be an optical element that transmits part of the excitation light outputted from the light source by a predetermined proportion and reflects the other part of the excitation light.

In the light source apparatus according to the aspect of the present disclosure, the wavelength converter may be a fixed wavelength converter in which the region on which the excitation light is incident does not change over time.

The wavelength converter may be a movable wavelength converter in which the region on which the excitation light is incident changes over time.

A projector according to another aspect of the present disclosure may have the configuration below.

The projector according to the other aspect of the present disclosure includes the light source apparatus according to the aforementioned aspect of the present disclosure, a light modulator that modulates light from the light source apparatus in accordance with image information, and a projection optical apparatus that projects the light modulated by the light modulator.

What is claimed is:

1. A light source apparatus comprising:
   a light source that outputs excitation light;
   a wavelength converter including a reflection layer and a wavelength conversion layer that is provided on a light incident side of the reflection layer and converts the excitation light in terms of wavelength into wavelength converted light having a wavelength band different from a wavelength band of the excitation light;
   a first optical element that causes a first polarization component out of the excitation light from the light source to be incident on the wavelength converter; and
   a second optical element that is disposed in an optical path between the light source and the wavelength converter and causes the first polarization component out of reflected light of the excitation light reflected off the wavelength converter to exit toward the wavelength converter, wherein the second optical element transmits a second polarization component which is different from the first polarization component.

2. The light source apparatus according to claim 1, wherein the second optical element is disposed around a primary luminous flux of the excitation light outputted from the light source.

3. The light source apparatus according to claim 1, further comprising a reduction optical system that is disposed in the optical path between the light source and the first optical element and reduces a luminous flux diameter of the excitation light, wherein the second optical element has an aperture and is so disposed that the aperture is located around the excitation light having the luminous flux diameter reduced by the reduction optical system.

4. The light source apparatus according to claim 1, wherein the second optical element causes the reflected light of the excitation light reflected off the wavelength converter to be incident on a light incident surface of the wavelength converter in such a way that a peak of an intensity distribution of the reflected light is shifted from a peak of the intensity distribution of the excitation light from the light source.

5. The light source apparatus according to claim 1, further comprising:

a diffuser that is disposed on an opposite side of the first optical element from the wavelength converter and diffuses part of the excitation light from the light source; and a phase retarder that is disposed between the light source and the first optical element and separates the excitation light from the light source into a first polarization component and a second polarization component, wherein the first optical element has the polarization separation function of outputting the first polarization component of the excitation light separated by the phase retarder to the wavelength converter and the second polarization component of the excitation light separated by the phase retarder to the diffuser.

6. The light source apparatus according to claim 1, wherein the first optical element is an optical element that transmits part of the excitation light outputted from the light source by a predetermined proportion and reflects another part of the excitation light.

7. The light source apparatus according to claim 1, wherein the wavelength converter is a fixed wavelength converter in which a region on which the excitation light is incident does not change over time.

8. The light source apparatus according to claim 1, wherein the wavelength converter is a movable wavelength converter in which a region on which the excitation light is incident changes over time.

9. A projector comprising:

the light source apparatus according to claim 1;

a light modulator that modulates light from the light source apparatus in accordance with image information; and a projection optical apparatus that projects the light modulated by the light modulator.

10. A light source apparatus comprising:

a light source that outputs excitation light;

a wavelength converter including a reflection layer and a wavelength conversion layer that is provided on a light incident side of the reflection layer and converts the excitation light in terms of wavelength into wavelength converted light having a wavelength band different from a wavelength band of the excitation light;

a first optical element that causes the excitation light from the light source to be incident on the wavelength converter; and a second optical element that is disposed in an optical path between the light source and the wavelength converter and causes at least part of reflected light of the excitation light reflected off the wavelength converter to exit toward the wavelength converter, wherein the first optical element is an optical element that transmits part of a first polarization component out of the excitation light outputted from the light source by a predetermined proportion and reflects another part of the first polarization component out of the excitation light.

11. A light source apparatus comprising:

a light source that outputs excitation light;

a wavelength converter including a reflection layer and a wavelength conversion layer that is provided on a light incident side of the reflection layer and converts the excitation light in terms of wavelength into wavelength converted light having a wavelength band different from a wavelength band of the excitation light;

a first optical element that causes the excitation light from the light source to be incident on the wavelength converter; and a second optical element that is disposed in an optical path between the light source and the first optical element and causes at least part of reflected light of the excitation light reflected off the wavelength converter to exit toward the wavelength converter, wherein the reflected light of the excitation light reflected off the wavelength converter enters the second optical element via the first optical element.

* * * * *